US012705092B2

(12) United States Patent
Foley

(10) Patent No.: US 12,705,092 B2
(45) Date of Patent: Aug. 11, 2026

(54) HIGHLY PARALLEL PROCESSING ARCHITECTURE WITH OUT-OF-ORDER RESOLUTION

(71) Applicant: Ascenium, Inc., Campbell, CA (US)

(72) Inventor: Peter Foley, Los Altos Hills, CA (US)

(73) Assignee: Ascenium, Inc., Mountain View, CA (US)

( * ) Notice: Subject to any disclaimer, the term of this patent is extended or adjusted under 35 U.S.C. 154(b) by 581 days.

(21) Appl. No.: 18/119,315

(22) Filed: Mar. 9, 2023

(65) Prior Publication Data

US 2023/0273818 A1 Aug. 31, 2023

Related U.S. Application Data

(63) Continuation-in-part of application No. 17/526,003, filed on Nov. 15, 2021, which is a (Continued)

(51) Int. Cl.
*G06F 9/48* (2006.01)
*G06F 8/41* (2018.01)

(52) U.S. Cl.
CPC .............. *G06F 9/4881* (2013.01); *G06F 8/41* (2013.01)

(58) Field of Classification Search
CPC .... G06F 9/4881; G06F 9/5016; G06F 9/5027; G06F 8/445; G06F 2209/5017; G06F 9/5038
See application file for complete search history.

(56) References Cited

U.S. PATENT DOCUMENTS 5,594,884 A 1/1997 Matoba et al.
5,764,994 A 6/1998 Craft
(Continued)

FOREIGN PATENT DOCUMENTS

KR 10-2015-0051083 A 5/2015
WO WO2011038940 A1 4/2011

OTHER PUBLICATIONS

International Search Report dated Jun. 28, 2023 for PCT U.S. Appl. No. 23/014,863.

(Continued)

*Primary Examiner* — Sisley N Kim
(74) *Attorney, Agent, or Firm* — Adams Intellex, PLC

(57) ABSTRACT

Techniques for task processing based on a highly parallel processing architecture with out-of-order resolution are disclosed. A two-dimensional array of compute elements is accessed. Each compute element within the array of compute elements is known to a compiler and is coupled to its neighboring compute elements within the array of compute elements. The array of compute elements is coupled to supporting logic and to memory, which, along with the array of compute elements, comprise compute hardware. A set of directions is provided to the hardware, through a control word generated by the compiler, for compute element operation. The set of directions is augmented with data access ordering information. The data access ordering is performed by the hardware. A compiled task is executed on the array of compute elements, based on the set of directions that was augmented.

22 Claims, 7 Drawing Sheets

Related U.S. Application Data continuation-in-part of application No. 17/465,949, filed on Sep. 3, 2021.

(60) Provisional application No. 63/447,915, filed on Feb. 24, 2023, provisional application No. 63/442,131, filed on Jan. 31, 2023, provisional application No. 63/424,960, filed on Nov. 14, 2022, provisional application No. 63/424,961, filed on Nov. 14, 2022, provisional application No. 63/402,490, filed on Aug. 31, 2022, provisional application No. 63/400,087, filed on Aug. 23, 2022, provisional application No. 63/393,989, filed on Aug. 1, 2022, provisional application No. 63/388,268, filed on Jul. 12, 2022, provisional application No. 63/357,030, filed on Jun. 30, 2022, provisional application No. 63/340,499, filed on May 11, 2022, provisional application No. 63/322,245, filed on Mar. 22, 2022, provisional application No. 63/318,413, filed on Mar. 10, 2022, provisional application No. 63/254,557, filed on Oct. 12, 2021, provisional application No. 63/232,230, filed on Aug. 12, 2021, provisional application No. 63/229,466, filed on Aug. 4, 2021, provisional application No. 63/193,522, filed on May 26, 2021, provisional application No. 63/166,298, filed on Mar. 26, 2021, provisional application No. 63/125,994, filed on Dec. 16, 2020, provisional application No. 63/114,003, filed on Nov. 16, 2020, provisional application No. 63/091,947, filed on Oct. 15, 2020, provisional application No. 63/075,849, filed on Sep. 9, 2020.

(56) References Cited

U.S. PATENT DOCUMENTS

| | | | |
|---|---|---|---|
| 7,840,777 | B2 | 11/2010 | Mykland |
| 8,694,978 | B1 | 4/2014 | Rus et al. |
| 8,856,768 | B2 | 10/2014 | Mykland |
| 8,869,123 | B2 | 10/2014 | Mykland |
| 8,949,806 | B1 | 2/2015 | Lee et al. |
| 9,158,544 | B2 | 10/2015 | Mykland |
| 9,304,770 | B2 | 4/2016 | Mykland |
| 9,395,992 | B2 | 7/2016 | Doing et al. |
| 9,424,055 | B2 | 8/2016 | Lundvall et al. |
| 9,473,155 | B2 | 10/2016 | Staszewski et al. |
| 9,477,470 | B2 | 10/2016 | Mykland |
| 9,529,715 | B2 | 12/2016 | Kumar et al. |
| 9,582,277 | B2 | 2/2017 | Muff et al. |
| 9,594,559 | B2 | 3/2017 | Fontenot et al. |
| 9,600,287 | B2 | 3/2017 | Gschwind et al. |
| 9,633,160 | B2 | 4/2017 | Mykland |
| 9,652,238 | B2 | 5/2017 | Muff et al. |
| 9,684,511 | B2 | 6/2017 | Shanbhogue et al. |
| 9,830,164 | B2 | 11/2017 | Yazdani |
| 9,851,969 | B2 | 12/2017 | Greiner et al. |
| 9,886,277 | B2 | 2/2018 | Loktyukhin et al. |
| 9,898,293 | B2 | 2/2018 | Whittaker |
| 9,921,836 | B2 | 3/2018 | Kumar et al. |
| 9,928,062 | B2 | 3/2018 | Azagury et al. |
| 9,934,040 | B2 | 4/2018 | Bonanno et al. |
| 9,971,605 | B2 | 5/2018 | Henry et al. |
| 9,977,674 | B2 | 5/2018 | Rupley, II et al. |
| 9,977,675 | B2 | 5/2018 | Nystad |
| 9,977,679 | B2 | 5/2018 | Caulfield et al. |
| 9,983,882 | B2 | 5/2018 | Greiner et al. |
| 9,983,884 | B2 | 5/2018 | Maiyuran et al. |
| 10,089,277 | B2 | 10/2018 | Mykland |
| 2002/0174318 | A1 | 11/2002 | Studdard et al. |
| 2004/0111710 | A1 | 6/2004 | Chakradhar et al. |
| 2013/0304996 | A1 | 11/2013 | Venkataraman et al. |
| 2013/0326190 | A1 | 12/2013 | Chung et al. |
| 2014/0149657 | A1 | 5/2014 | Jakovljevic et al. |
| 2014/0317383 | A1 | 10/2014 | Park et al. |
| 2014/0372730 | A1 | 12/2014 | Qadri et al. |
| 2015/0186146 | A1 | 7/2015 | Kushida et al. |
| 2016/0246602 | A1 | 8/2016 | Radhika et al. |
| 2016/0313984 | A1* | 10/2016 | Meixner ............. G06F 9/30134 |
| 2018/0225116 | A1 | 8/2018 | Henry et al. |
| 2018/0307980 | A1 | 10/2018 | Barik et al. |
| 2018/0322606 | A1 | 11/2018 | Das et al. |
| 2018/0341493 | A1 | 11/2018 | Roy et al. |
| 2019/0004777 | A1 | 1/2019 | Meixner |
| 2019/0188824 | A1 | 6/2019 | Meixner et al. |
| 2019/0347190 | A1 | 11/2019 | Singh |
| 2019/0369990 | A1 | 12/2019 | Doerr et al. |
| 2020/0026498 | A1 | 1/2020 | Sumbul et al. |
| 2020/0192860 | A1 | 6/2020 | Mykland |
| 2020/0241879 | A1 | 7/2020 | Vorbach et al. |
| 2020/0310814 | A1* | 10/2020 | Kothinti Naresh ... G06F 9/4881 |
| 2021/0026632 | A1* | 1/2021 | Dooley ................. G06F 9/3005 |
| 2022/0075651 | A1* | 3/2022 | Harboe ................... G06F 8/445 |

OTHER PUBLICATIONS

Musicus, B. R. (1988). The OKI advanced array processor (AAP): Development Software Manual.

Chang, Kyungwook, and Kiyoung Choi. "Mapping control intensive kernels onto coarse-grained reconfigurable array architecture." 2008 International SoC Design Conference. vol. 1. IEEE, 2008.

* cited by examiner

400

L3 DATA CACHES 448

CCWC2 436

CCWC1 434

DECOMPRESSOR 432

CONTROL UNIT 430

L3 DATA CACHES 422

L2 DATA CACHES 446

L1 DATA CACHES 444

ACCESS BUFFERS 443

CROSSBAR SWITCH AND LOGIC 442

LOAD BUFFERS 441

MULTIPLIER ELEMENT 440

COMPUTE ELEMENT ARRAY 410

MULTIPLIER ELEMENT 413

LOAD BUFFERS 414

CROSSBAR SWITCH AND LOGIC 415

ACCESS BUFFERS 416

L1 DATA CACHES 418

L2 DATA CACHES 420

TRANSLATION AND LOOK-ASIDE BUFFERS 438

SYS MANAGEMENT BUFF 424

DECOMPRESSOR 426

SYSTEM MANAGEMENT CCW 428

TRANSLATION AND LOOK-ASIDE BUFFERS 412

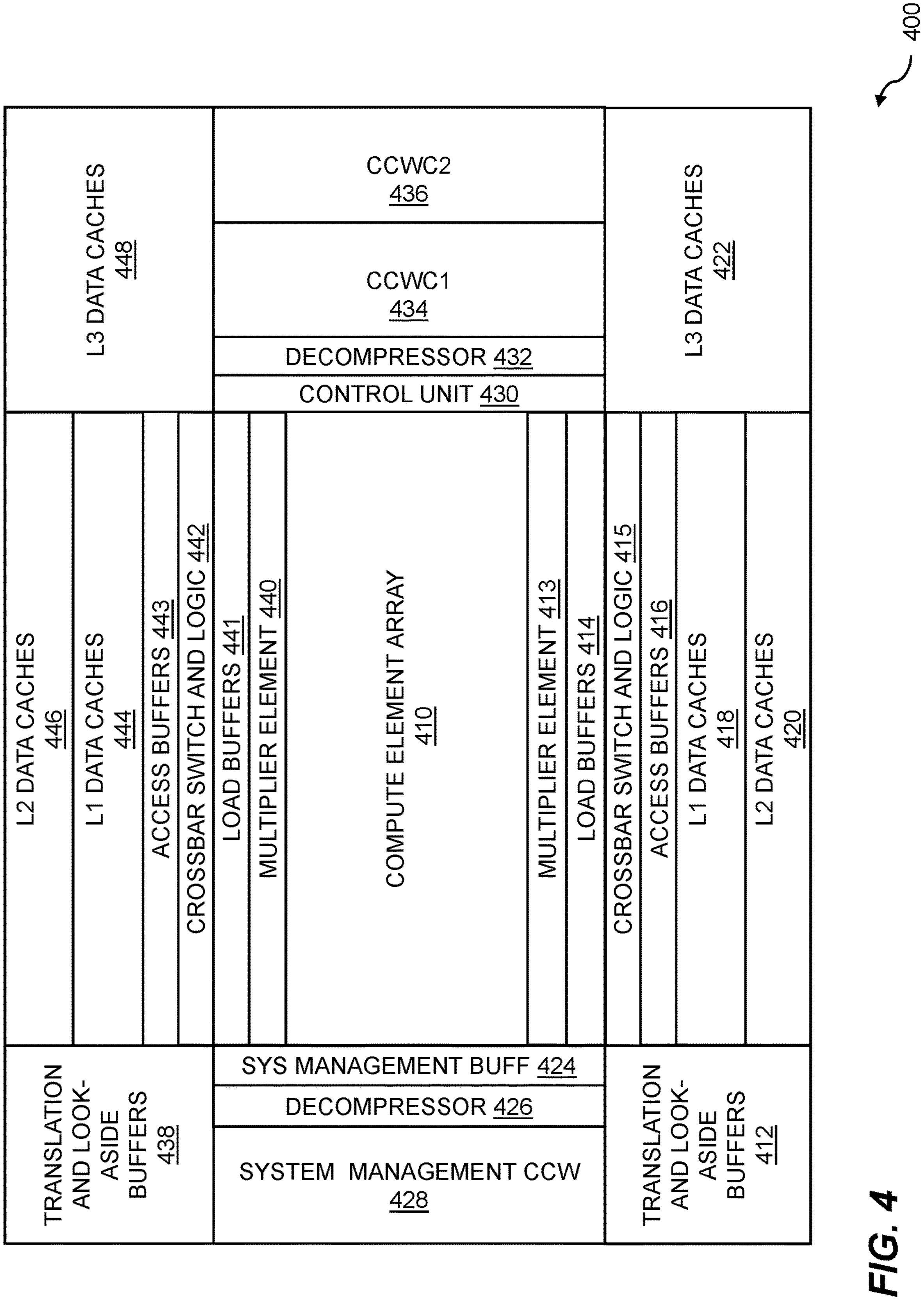

FIG. 4

HIGHLY PARALLEL PROCESSING ARCHITECTURE WITH OUT-OF-ORDER RESOLUTION

RELATED APPLICATIONS

This application claims the benefit of U.S. provisional patent applications "Highly Parallel Processing Architecture With Out-Of-Order Resolution" Ser. No. 63/318,413, filed Mar. 10, 2022, "Autonomous Compute Element Operation Using Buffers" Ser. No. 63/322,245, filed Mar. 22, 2022, "Parallel Processing Of Multiple Loops With Loads And Stores" Ser. No. 63/340,499, filed May 11, 2022, "Parallel Processing Architecture With Split Control Word Caches" Ser. No. 63/357,030, filed Jun. 30, 2022, "Parallel Processing Architecture With Countdown Tagging" Ser. No. 63/388,268, filed Jul. 12, 2022, "Parallel Processing Architecture With Dual Load Buffers" Ser. No. 63/393,989, filed Aug. 1, 2022, "Parallel Processing Architecture With Bin Packing" Ser. No. 63/400,087, filed Aug. 23, 2022, "Parallel Processing Architecture With Memory Block Transfers" Ser. No. 63/402,490, filed Aug. 31, 2022, "Parallel Processing Using Hazard Detection And Mitigation" Ser. No. 63/424,960, filed Nov. 14, 2022, "Parallel Processing With Switch Block Execution" Ser. No. 63/424,961, filed Nov. 14, 2022, "Parallel Processing With Hazard Detection And Store Probes" Ser. No. 63/442,131, filed Jan. 31, 2023, and "Parallel Processing Architecture For Branch Path Suppression" Ser. No. 63/447,915, filed Feb. 24, 2023.

This application is also a continuation-in-part of U.S. patent application "Highly Parallel Processing Architecture With Compiler" Ser. No. 17/526,003, filed Nov. 15, 2021, which claims the benefit of U.S. provisional patent applications "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, "Parallel Processing Architecture For Atomic Operations" Ser. No. 63/229,466, filed Aug. 4, 2021, "Parallel Processing Architecture With Distributed Register Files" Ser. No. 63/232,230, filed Aug. 12, 2021, and "Load Latency Amelioration Using Bunch Buffers" Ser. No. 63/254,557, filed Oct. 12, 2021.

The U.S. patent application "Highly Parallel Processing Architecture With Compiler" Ser. No. 17/526,003, filed Nov. 15, 2021 is also a continuation-in-part of U.S. patent application "Highly Parallel Processing Architecture With Shallow Pipeline" Ser. No. 17/465,949, filed Sep. 3, 2021, which claims the benefit of U.S. provisional patent applications "Highly Parallel Processing Architecture With Shallow Pipeline" Ser. No. 63/075,849, filed Sep. 9, 2020, "Parallel Processing Architecture With Background Loads" Ser. No. 63/091,947, filed Oct. 15, 2020, "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, Parallel Processing Architecture For Atomic Operations" Ser. No. 63/229,466, filed Aug. 4, 2021, and "Parallel Processing Architecture With Distributed Register Files" Ser. No. 63/232,230, filed Aug. 12, 2021.

Each of the foregoing applications is hereby incorporated by reference in its entirety.

FIELD OF ART

This application relates generally to task processing and more particularly to a highly parallel processing architecture with out-of-order resolution.

BACKGROUND

Organizations large and small process immense, varied, and often unstructured datasets for commercial, educational, governmental, medical, research, or retail purposes, to name but a few. Substantial organizational resources are committed annually to data processing because an organization directly relies on its ability to process the data for financial and competitive advantage. The organization flourishes when the data processing fulfills organizational objectives, or founders if the data processing is unsuccessful. Data that is processed is collected from a large and diverse range of individuals using techniques that are many and varied. The individuals include purchasers, customers, patients, students, test subjects, volunteers, and citizens. While some of the individuals are willing data providers, others can be unwitting subjects or even victims of data collection. Legitimate data collection strategies include "opt-in" techniques, where an individual signs up, registers, creates an account, or otherwise actively agrees to participate in the data collection. Other techniques are legislative, such as a government requiring that citizens obtain a registration number and use that number while interacting with government agencies, law enforcement, emergency services, and others. Additional data collection techniques are more subtle or thoroughly hidden, such as tracking purchase histories, website visits, button clicks, and menu choices. Regardless of the data collection techniques used, the quantity of collected data is large and the data is highly valuable. Rapid and accurate processing of this large amount of data is critical.

SUMMARY

Organizations perform significant numbers of processing jobs in support of their organizational missions. Any one of the processing jobs can be deemed mission-critical to the organization, so timely and efficient execution of the processing jobs is essential. The types of jobs that are typically processed include running payroll, analyzing research data, or training a neural network for machine learning, among many others. These jobs are highly complex and are typically based on the successful execution of many tasks. The tasks can include loading and storing various datasets, accessing processing components and systems, executing data processing, and so on. The tasks are typically based on subtasks that in turn can be complex. The subtasks are often used to handle specific jobs such as loading data from storage; performing arithmetic computations, logic evaluations, and other manipulations of the data; storing the data back to storage; handling inter-subtask communication such as data transfer and control; and so on. The datasets that are accessed are usually extensive in both size and complexity. Processing of the datasets can easily overwhelm traditional processing architectures. Processing architectures, such as Von Neumann class configurations that are either poorly matched to the processing tasks or inflexible in their designs, simply cannot manage the data handing and computation tasks.

Significant improvements to efficiency and throughput of task processing can be accomplished with two-dimensional (2D) arrays of elements. The 2D arrays of elements can be configured and used for the processing of the tasks and subtasks. The 2D arrays include compute elements, controllers, decompressors, arithmetic logic units (ALUs), multiplier elements, registers, caches, queues, register files, buffers, storage elements, and other components which can communicate among themselves. These arrays of elements are configured and operated by providing directions to the array of elements, on a cycle-by-cycle basis, in wide, variable length control words. The control of the 2D array is accomplished by providing directions with ordering information for an architectural cycle, where the architectural cycle can contain multiple compute element operations. The control words provide explicit ordering information in separate, dedicated fields of the control word. The hardware then detects and mitigates data access hazards based on the explicit ordering information in the control word, and in a manner that is outside the scope of explicit control word control, which is to say that the ordering is managed by the hardware outside of explicit compiler control. The ordering information can include ordering information for load and/or store operations that read and/or write data to memory. The load and/or store ordering information further enables the hardware to detect data access hazards such as write-after-read, read-after-write, and write-after-write conflicts. The data access hazards can be resolved by actions including delaying loads, delaying stores, suppressing stores, and forwarding stores to loads. The delaying can be accomplished by holding data for the load and/or store in buffers.

A set of directions is provided through a control word. The control word can be generated by a compiler. The control words can be provided as a stream of control words, where the control words can include wide, variable length, microcode control words generated by the compiler. The control can include words that are based on bunches of bits. An associative memory can be included in each compute element of a topological set of compute elements, where a topological set of compute elements can include a circuit topology such as a systolic, a vector, a cyclic, a spatial, a streaming, or a Very Long Instruction Word (VLIW) topology, among others. The topologies can include a topology that enables machine learning functionality.

Task processing is enabled by a highly parallel processing architecture with out-of-order resolution. Techniques for task processing based on a highly parallel processing architecture with out-of-order resolution are disclosed. A two-dimensional array of compute elements is accessed. Each compute element within the array of compute elements is known to a compiler and is coupled to its neighboring compute elements within the array of compute elements. The array of compute elements is coupled to supporting logic and to memory, which, along with the array of compute elements, comprises compute hardware. A set of directions is provided to the hardware, through a control word generated by the compiler, for compute element operation. The set of directions is augmented with data access ordering information. The data access ordering is performed by the hardware. A compiled task is executed on the array of compute elements, based on the set of directions that was augmented. The ordering information includes ordering information for a single architectural cycle. The ordering information further includes ordering information for load and/or store operations. The load and/or store ordering information enables the hardware to detect data access hazards. The ordering information provided by the compiler enables data hazards to be detected and mitigated, where this detection and mitigation is performed by the hardware. A compiled task is executed on the array of compute elements. A data hazard that was detected can be resolved by actions including delaying loads, delaying stores, suppressing stores, and forwarding stores to loads. The delaying can be accomplished by holding data in buffers. The data held in buffers is committed after the data access hazard detection and mitigation window has expired. A processor-implemented method for task processing is disclosed comprising: accessing a two-dimensional array of compute elements, wherein each compute element within the array of compute elements is known to a compiler and is coupled to its neighboring compute elements within the array of compute elements, and wherein the array of compute elements is coupled to supporting logic and to memory, which together with the array of compute elements comprises compute hardware; providing a set of directions to the hardware, through a control word generated by the compiler, for compute element operation; augmenting the set of directions with data access ordering information, wherein data access ordering is performed by the compute hardware; and executing a compiled task on the array of compute elements, based on the set of directions that was augmented.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 4 illustrates a system block diagram for a highly parallel architecture with a shallow pipeline.

DETAILED DESCRIPTION

Figure 1:
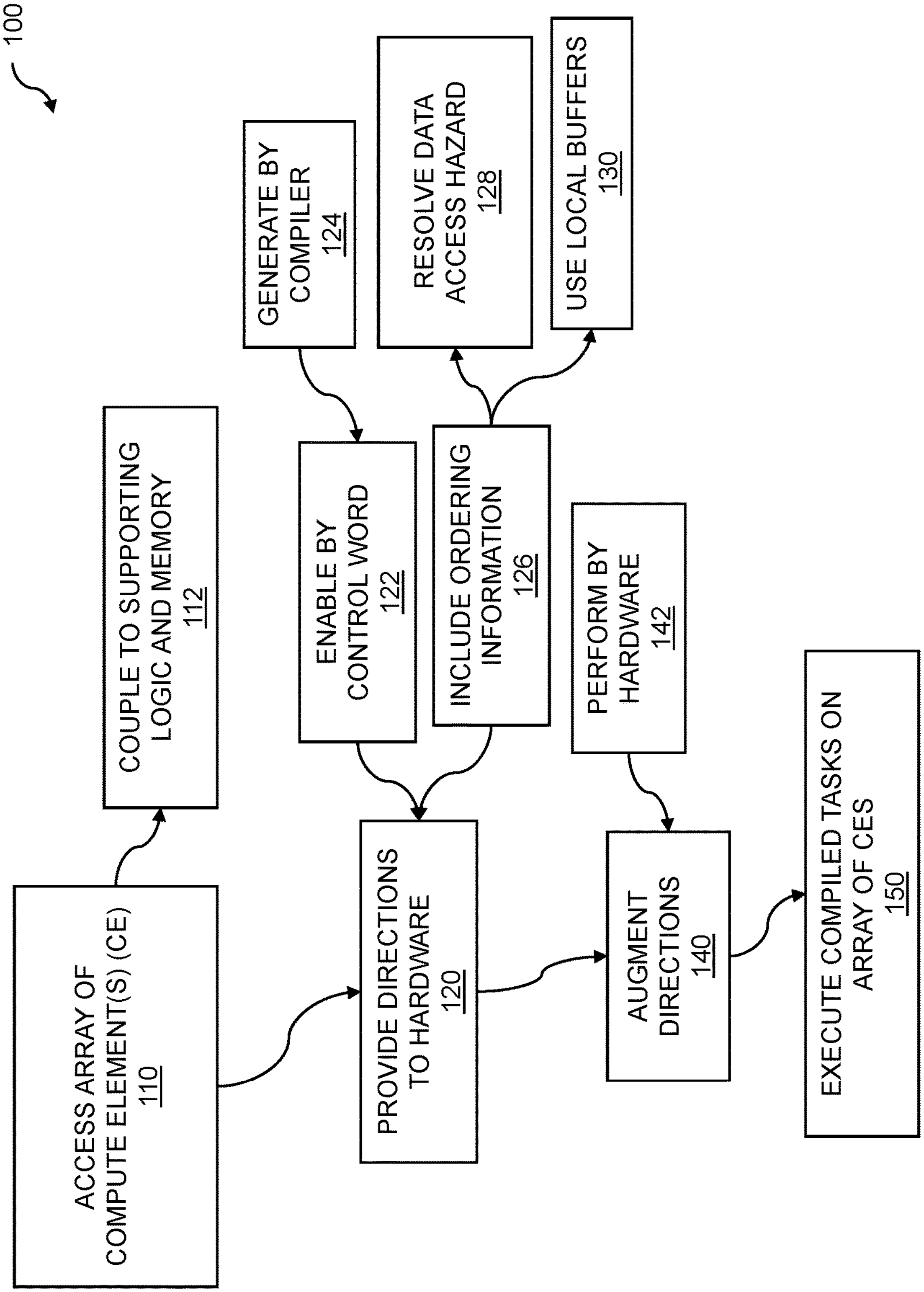
FIG. 1 is a flow diagram for a highly parallel processing architecture with out-of-order resolution.

Techniques for a highly parallel processing architecture with out-of-order resolution are disclosed. In a processing architecture such as an architecture based on configurable compute elements described herein, the loading of data, directions, control words, compute element operations, and so on can cause execution of a process, task, subtask, and the like to stall. The stalling can cause execution of a single compute element to halt or suspend until needed data and control can be obtained. In the worst case, the stalling of the compute element can result in stalling of an entire two-dimensional (2D) array of compute elements. Noted throughout, directions based on control words for the array of compute elements are provided on a cycle-by-cycle basis. The control can be based on one or more sets of directions, where data hazards can be detected and mitigated in compliance with the ordering information. The ordering information can include ordering information for a single architectural cycle, where the single architectural cycle contains multiple compute element operations. The ordering can include ordering information for load and/or store operations. The directions that are provided to the array of compute elements through control words can be enabled by a stream of wide, variable length, control words generated by a compiler. The compiler can include a general-purpose compiler, a specialized compiler, etc. The control words comprise bits. The control word bits provide operational control for the compute element. In addition to providing control to the compute elements within the array, data can be transferred or "preloaded" into caches, registers, an associative memory, and so on prior to executing the tasks or subtasks that process the data.

The control words can be loaded into one or more of caches, storage elements, registers, etc. that are associated with or accessible to the compute hardware. The registers can be based on a memory element with two read ports and one write port (2R1W). The 2R1W memory element enables two read operations and one write operation to occur substantially simultaneously. An associative memory can be included in each compute element of a set of compute elements. The associative memory can be based on a 2R1W register file, where the 2R1W register file can be distributed throughout the array. The specific control words associated with the provided directions can be written to an associative memory associated with each compute element within the 2D array of compute elements, such as a compressed control word cache. The specific sets of directions can configure the compute elements, enable the compute elements to execute compute element operations within the array, and so on. The directions can designate a topological set of compute elements from the 2D array of compute elements. The designating a topological set of compute elements can include placement and routing information for the compute elements and other elements within the 2D array of compute elements.

The specific set of compute element operations associated with the directions can include a number of operations that can accomplish some or all of the operations associated with a task, a subtask, and so on. By providing a sufficient number of operations, autonomous operation of the compute element can be accomplished. The autonomous operation of the compute element can be based on operational looping, where the operational looping is enabled without additional direction loading. Recall that latency associated with access by a compute element to storage can be significant and can cause the compute element to stall. By performing ordering of operations without additional loading of directions, load latency can be eliminated, thus expediting the execution of operations. Further, the ordering can include ordering information for load and/or store operations. The ordering can enable the hardware to detect data access hazards such as write-after-read, read-after-write, and write-after-write conflicts. The data access hazards can be resolved by actions including delaying loads, delaying stores, suppressing stores, and forwarding stores to loads, where data for the load and/or store is held in buffers until after the data access hazard detection and mitigation window has expired.

Tasks and subtasks that are executed by the compute elements within the array of compute elements can be associated with a wide range of applications. The applications can be based on data manipulation, such as image or audio processing applications, facial recognition, voice recognition, AI applications, business applications, data processing and analysis, and so on. The tasks that are executed can perform a variety of operations including arithmetic operations, shift or rotate operations, logical operations including Boolean operations, vector or matrix operations, tensor operations, and the like. The subtasks can be executed based on precedence, priority, coding order, amount of parallelization, data flow, data availability, compute element availability, communication channel availability, and so on.

The data manipulations are performed on a two-dimensional (2D) array of compute elements (CEs). The compute elements within the 2D array can be implemented with central processing units (CPUs), graphics processing units (GPUs), application specific integrated circuits (ASICs), field programmable gate arrays (FPGAs), processing cores, or other processing components or combinations of processing components. The compute elements can include heterogeneous processors, homogeneous processors, processor cores within an integrated circuit or chip, etc. The array of compute elements can be coupled to supporting logic and to memory, all of which together comprise compute hardware. The compute elements can be coupled to local storage, which can include local memory elements, register files, cache storage, associative memories, etc. The cache, which can include a hierarchical cache such as an L1, L2, and L3 cache, can be used for storing data such as intermediate results, compressed control words, coalesced control words, decompressed control words, relevant portions of a control word, and the like. The cache can store data produced by a taken branch path, where the taken branch path is determined by a branch decision. The decompressed control word is used to control one or more compute elements within the array of compute elements. Multiple layers of the two-dimensional (2D) array of compute elements can be "stacked" to comprise a three-dimensional array of compute elements.

The tasks, subtasks, etc., that are associated with processing operations are generated by a complier. The compiler can include a general-purpose compiler, a hardware description-based compiler, a compiler written or "tuned" for the array of compute elements, a constraint-based compiler, a satisfiability-based compiler (SAT solver), and so on. Control is provided to the hardware in the form of directions through control words, where one or more control words are generated by the compiler. The control words are provided to the array on a cycle-by-cycle basis. The control words can include wide, variable length, microcode control words. The length of a microcode control word can be adjusted by compressing the control word. The compressing can be accomplished by recognizing situations where a compute element is unneeded by a task. Thus, control bits within the control word associated with the unneeded compute elements are not required for that compute element. Other compression techniques can also be applied. The control words can be used to route data, to set up operations to be performed by the compute elements, to idle individual compute elements or rows and/or columns of compute elements, etc. Noting that the compiled microcode control words that are generated by the compiler are based on bits, the control words can be compressed by selecting bits from the control words. The control of the compute elements can be accomplished by a control unit.

A highly parallel processing architecture with out-of-order resolution enables task processing. The task processing can include data manipulation. A two-dimensional (2D) array of compute elements is accessed. The compute elements can include compute elements, processors, or cores within an integrated circuit; processors or cores within an application specific integrated circuit (ASIC); cores programmed within a programmable device such as a field programmable gate array (FPGA); and so on. The compute elements can include homogeneous or heterogeneous processors. Each compute element within the array of compute elements is known to a compiler. The compiler, which can include a general-purpose compiler, a hardware-oriented compiler, or a compiler specific to the compute elements, can compile code for each of the compute elements. Each compute element is coupled to its neighboring compute elements within the 2D array of compute elements. The coupling of the compute elements enables data communication between and among compute elements. Thus, the compiler can control data flow between and among the compute elements and can also control data commitment to memory outside of the array. The array of compute elements is coupled to supporting logic and to memory, all of which together comprise compute hardware. The supporting logic can include a control, an arithmetic logic unit (ALU), a multiply-accumulate (MAC) unit, a matrix multiplier unit, and so on. The memory can include a register file, local storage, cache storage, shared storage, remote storage, etc. The memory can include an associative memory.

A set of directions is provided to the hardware, through a control word generated by the compiler, for compute element operation and memory access precedence, wherein the set of directions includes ordering information. The control word can include a wide, variable length, control word generated by the compiler. The directions can be provided on a cycle-by-cycle basis. A cycle can include a clock cycle, an architectural cycle, a system cycle, etc. The ordering information includes ordering information for a single architectural cycle. The architectural cycle basis reflects non-wall clock, compiler time. The single architectural cycle contains multiple compute element operations. The ordering information includes ordering information for load and/or store operations, which enables the hardware to detect data hazards. The control word, such as a wide, variable length, control word generated by the compiler, provides direct, fine-grained control of the 2D array of compute elements. The fine-grained control can include control of individual compute elements, memory elements, control elements, etc. The set of data accesses complies with the ordering information. A data hazard that was detected can be resolved. Since a data hazard can be based on memory access conflicts such as write-after-read, read-after-write, and write-after-write conflicts, loads and/or stores can be delayed. The delay can be accomplished by holding data for the load and/or store in buffers. The data held in buffers can then be committed after the data hazard detection and mitigation window has expired. A compiled task is executed on the array of compute elements, based on the set of control words. The compute element operations can enable specific arithmetic, logical, matrix, tensor, neural network, or other operations within the array of compute elements. The compute element operations can enable autonomous compute element operation. The autonomous operation can include operational looping within the compute elements. The operational looping can be enabled without additional control word loading.

FIG. 1 is a flow diagram for a highly parallel processing architecture with out-of-order resolution. Groupings or clusters of compute elements (CEs), such as CEs assembled within a 2D array of CEs, can be configured to execute a variety of operations associated with data processing. The operations can be based on tasks and on subtasks that are associated with the tasks. The 2D array can further interface with other elements such as controllers, storage elements, ALUs, memory management units (MMUs), GPUs, multiplier elements, multiply-accumulate elements, and so on. The operations can accomplish a variety of processing objectives such as application processing, data manipulation, data analysis, and so on. The operations can manipulate a variety of data types including integer, real, and character data types; vectors and matrices; tensors; etc. In embodiments, the compute element operations can include arithmetic logic unit (ALU) operations, matrix multiplication operations, and so on. A set of directions, through a control word generated by a compiler, is provided to the array of compute elements on a cycle-by-cycle basis. The direction can be enabled by a stream of wide, variable length, control words generated by the compiler. The control words, which can include microcode control words, enable or idle various compute elements; provide data; route results between or among CEs, caches, and storage; and the like. The control enables compute element operation, memory access precedence, etc. The directions can further include memory access ordering. Compute element operation ordering and memory access ordering enable the hardware to properly sequence data provision and compute element results. The control enables execution of a compiled program on the array of compute elements.

The flow 100 includes accessing a two-dimensional (2D) array of compute elements 110, wherein each compute element within the array of compute elements is known to a compiler and is coupled to its neighboring compute elements within the array of compute elements. The compute elements can be based on a variety of types of processors. The compute elements or CEs can include central processing units (CPUs), graphics processing units (GPUs), processors or processing cores within application specific integrated circuits (ASICs), processing cores programmed within field programmable gate arrays (FPGAs), and so on. In embodiments, compute elements within the array of compute elements have identical functionality. The compute elements can include heterogeneous compute resources, where the heterogeneous compute resources may or may not be collocated within a single integrated circuit or chip. The compute elements can be configured in a topology, where the topology can be built into the array, programmed or configured within the array, etc. In embodiments, the array of compute elements is configured by a control word that can implement a topology. The topology that can be implemented can include one or more of a systolic, a vector, a cyclic, a spatial, a streaming, or a Very Long Instruction Word (VLIW) topology. In embodiments, the operations can be specified on a physical cycle-by-cycle basis. A physical cycle-by-cycle basis can be based on operations such as read-modify-write operations associated with data processing. In embodiments, the physical cycle-by-cycle basis comprises an architectural cycle.

The compute elements can further include a topology suited to machine learning functionality, where the machine learning functionality is mapped by the compiler. A topology for machine learning can include supervised learning, unsupervised learning, reinforcement learning, and other machine learning topologies, such as convolutional computation or general matrix multiply (GEMM) computation. The compute elements can be coupled to other elements within the array of CEs. In embodiments, the coupling of the compute elements can enable one or more further topologies. The other elements to which the CEs can be coupled can include storage elements such as one or more levels of cache storage; control units; multiplier units; address generator units for generating load (LD) and store (ST) addresses; queues; register files; and so on. The compiler to which each compute element is known can include a C, C++, or Python compiler. The compiler to which each compute element is known can include a compiler written especially for the array of compute elements. The coupling of each CE to its neighboring CEs enables clustering of compute resources; sharing of elements such as cache elements, multiplier elements, ALU elements, or control elements; communication between or among neighboring CEs; and the like.

In the flow 100, the array of compute elements is coupled to supporting logic and to memory 112, all of which together comprise compute hardware. The compute elements within the 2D array of compute elements can be coupled to other elements within the array. The elements can include storage elements such as one or more levels of cache storage; memory management units (MMUs); control units; arithmetic logic units (ALUs); multiplier units; multiply-accumulate (MAC) units; matrix multiple units; address generator units for generating load (LD) and store (ST) addresses; queues; register files; and so on. The coupling of each CE to its neighboring CEs enables clustering of compute resources; sharing of elements such as cache elements, multiplier elements, ALU elements, or control elements; communication between or among neighboring CEs; and the like. A set of compute elements can be associated with various topologies. In embodiments, topology can include one or more of a systolic, a vector, a cyclic, a spatial, a streaming, or a Very Long Instruction Word (VLIW) topology. The topology can include neural network functionality. In embodiments, a topology can include placement and routing information. The placement and routing information can include placing or assigning tasks and subtasks to compute elements, configuring the interconnections between the compute elements, and so on. The interconnections between compute elements can direct data and control to and from compute elements.

The flow 100 includes providing a set of directions 120 to the hardware. The directions can include directions for configuring the 2D array of compute elements. The directions can set up communications paths from array inputs to compute elements, between compute elements, from compute elements to array outputs, and so on. The directions can include multiple compute element operations. In the flow 100, the directions are provided through a control word 122. The control word can include a wide, variable length, control word. The control word can include a control word from a stream of control words. In the flow 100, the control word can be generated by the compiler 124. The compiler can a generate control word associated with one or more tasks, one or more subtasks associated with the tasks, etc. The compiler can include a general-purpose, high-level compiler such as a C, C++, or Python compiler. The compiler can include a hardware description language compiler such as a Verilog™ or VHDL compiler. The compiler can include a compiler implemented to support the 2D array of compute elements.

In the flow 100, the set of directions includes ordering information 126 for compute element operation and memory access precedence. A task, a subtask, and so on can be based on a graph such as a directed acyclic graph (DAG), a Petri Net, and so on. The graph can represent the flow of data through the graph, the operations that can be performed on the data, the order in which the operations are to be performed, etc. The directions can be ordered based on the flow of the graph, precedence or priority of tasks, parallelization of operations within the graph, and so on. In order for the operations to proceed, the data to be manipulated by the operation must be available for processing. Memory access precedence can be used to ensure that the tasks receive valid data when the data is needed. In embodiments, the memory access precedence can enable ordering of memory data. The memory data can be ordered within the memory based on a priority, on a point in the execution of a graph that the data is needed, and on other memory ordering techniques. Other memory ordering techniques can include first in first out (FIFO), least recently used (LRU), a stack model, etc. In other embodiments, the ordering of memory data enables compute element result sequencing. The result sequencing can set up data for processing by a subsequent operation. In a usage example, the result sequencing can include preprocessing the result in preparation for a Fast Fourier Transform (FFT) operation. The result can be a result from a load operation or a store operation, and thus the result sequencing can include load and/or store sequencing, which leads to the result. In embodiments, the ordering information includes ordering information for a single architectural cycle. The ordering information for a single cycle enables data that is being generated by compute element to be held for use by a subsequent or "downstream" compute element. In embodiments, the single architectural cycle contains multiple compute element operations. Discussed above and throughout, the multiple compute element operations can include arithmetic, logical, matrix, and other operations. The multiple compute element operations can be distributed across a plurality of compute elements.

In embodiments, the ordering information can include ordering information for load and/or store operations. The load and/or store operations can read and/or write data to various storage elements such as a register file, a cache, on-chip storage, off-chip storage, and so on. In embodiments, the load and/or store operations can read and/or write data to the memory. The memory can include a memory associated with a compute element, a shared memory, an associative memory, an off-chip memory, a memory coupled to the array of compute elements, a remote memory, and the like. In embodiments, the load and/or store operations can involve a temporal distance of more than one architectural cycle. The temporal distance can be associated with transferring resulting information from a first compute element to a second compute element. The inclusion of ordering information for load and/or store operations can enable the array of compute elements to identify problems that can occur when loading and/or storing operations. In embodiments, the load and/or store ordering information can enable the hardware to detect data access hazards. A data access hazard can be based on a reading or writing conflict, a timing conflict, a data not available event, and so on. In embodiments, the data access hazards can include write-after-read, read-after-write, and write-after-write conflicts.

The flow 100 further includes resolving 128 a data access hazard that was detected. The resolving can be accomplished using a variety of techniques such as retiming accesses to memory. In embodiments, the resolving can include delaying loads and/or stores, and forwarding store data as load return data. The delaying can be based on an amount of time, a number of cycles such as architectural cycles, etc. Data to be loaded and/or stored can be held. In the flow 100, data for the load and/or store is held in buffers 130. The buffers can be associated with a compute element, can be shared by a plurality of compute elements, and the like. Further embodiments can include using local buffers to delay commitment of data for the load and/or store operations. Recall that the data that can be stored can include load data and/or store data. In embodiments, the data for load operations is read from the memory, and in embodiments, the data for store operations is written to the memory. When data hazards are resolved, the load and/or store data can be committed. In embodiments, the data held in buffers can be committed after the data access hazard detection and mitigation window has expired. The window can be determined by a temporal pointer and/or counter that, as it advances, can be used to determine that it is safe to proceed with a load/store, based on the ordering information that is presented.

The flow 100 includes augmenting 140 the set of directions to comply with the ordering information. The augmenting can be used to determine an order of operations, priorities or precedence of various tasks and subtasks, and so on. The augmenting can accomplish obtaining data, forwarding data, producing data, and so on. In the flow 100, the augmented portion of the control word that contains the ordering information is performed by the hardware 142. The hardware, as discussed previously, can include the 2D array of compute elements, supporting logic, and memory. In embodiments, the compute hardware ensures semantic correctness of operations to the memory. The semantic correctness can be based on an order of operations such as PEDMAS. The acronym PEDMAS defines the order of operations in the source code to be parentheses, exponents, division and multiplication (progresses left to right), and addition and subtraction (again, left to right). Since different portions of an equation, for example, can be processed on different compute elements, the orders of operations become particularly important and difficult to enforce without the ordering information. In embodiments, the augmenting can be based on a temporal order. The temporal order can be based on a priority for tasks and subtasks, a precedence for tasks and subtasks, data dependencies (e.g., a second task processes results from a first task), and so on. The temporal order can be based on arithmetic precedence, logical precedence, etc.

The flow 100 includes executing 150 a compiled task on the array of compute elements, based on the set of control words. The task, and subtasks associated with the task, are based on the set of directions provided through a control word. The directions can include multiple compute element operations. The compute element operations can include arithmetic operations, logical operations, matrix operations, tensor operations, and so on. The operations that are executed are contained in the set of control words. Discussed above, the control words can include a stream of wide, variable length, control words generated by the compiler. The control words can be used to control the array of compute elements on a cycle-by-cycle basis. A cycle can include a local clock cycle, a self-timed cycle, a system cycle, and the like. The cycle can be based on an architectural cycle. An architectural cycle can include a read-modify-write cycle. In embodiments, the architectural cycle basis reflects non-wall clock, compiler time. The execution can include distributed execution of operations. In embodiments, the distributed execution of operations can occur in two or more compute elements within the array of compute elements. The compute elements can include independent compute elements, clustered compute elements, etc. Execution of specific compute element operations can enable parallel operation processing. The parallel operation processing can include processing nodes of a graph that are independent of each other, processing independent tasks and subtasks, etc. The operations can include arithmetic, logic, array, matrix, tensor, and other operations. A given compute element can be enabled for operation execution, idled for a number of cycles when the compute element is not needed, etc. The operations that are executed can be repeated. An operation can be based on a plurality of control words.

The operation that is being executed can include data dependent operations. In embodiments, the plurality of control words includes two or more data dependent branch operations. The branch operation can include two or more branches where a branch is selected based on an operation such as an arithmetic or logical operation. In a usage example, a branch operation can determine the outcome of an expression such as A>B. If A is greater than B, then one branch path can be taken. If A is less than or equal to B, then another branch path can be taken. In order to speed execution of a branch operation, sides of the branch can be precomputed prior to datum A and datum B being available. When the data is available, the expression can be computed, and the proper branch path can be chosen. The untaken branch data and operations can be discarded, flushed, etc. In embodiments, the two or more data dependent branch operations can require a balanced number of execution cycles. The balanced number of execution cycles can reduce or eliminate idle cycles, stalling, and the like. In embodiments, the balanced number of execution cycles is determined by the compiler. In embodiments, the generating, the customizing, and the executing can enable background memory accesses. The background memory access can enable a control element to access memory independently of other compute elements, a controller, etc. In embodiments, the background memory accesses can reduce load latency. Load latency is reduced since a compute element can access memory before the compute element exhausts the data that the compute element is processing.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
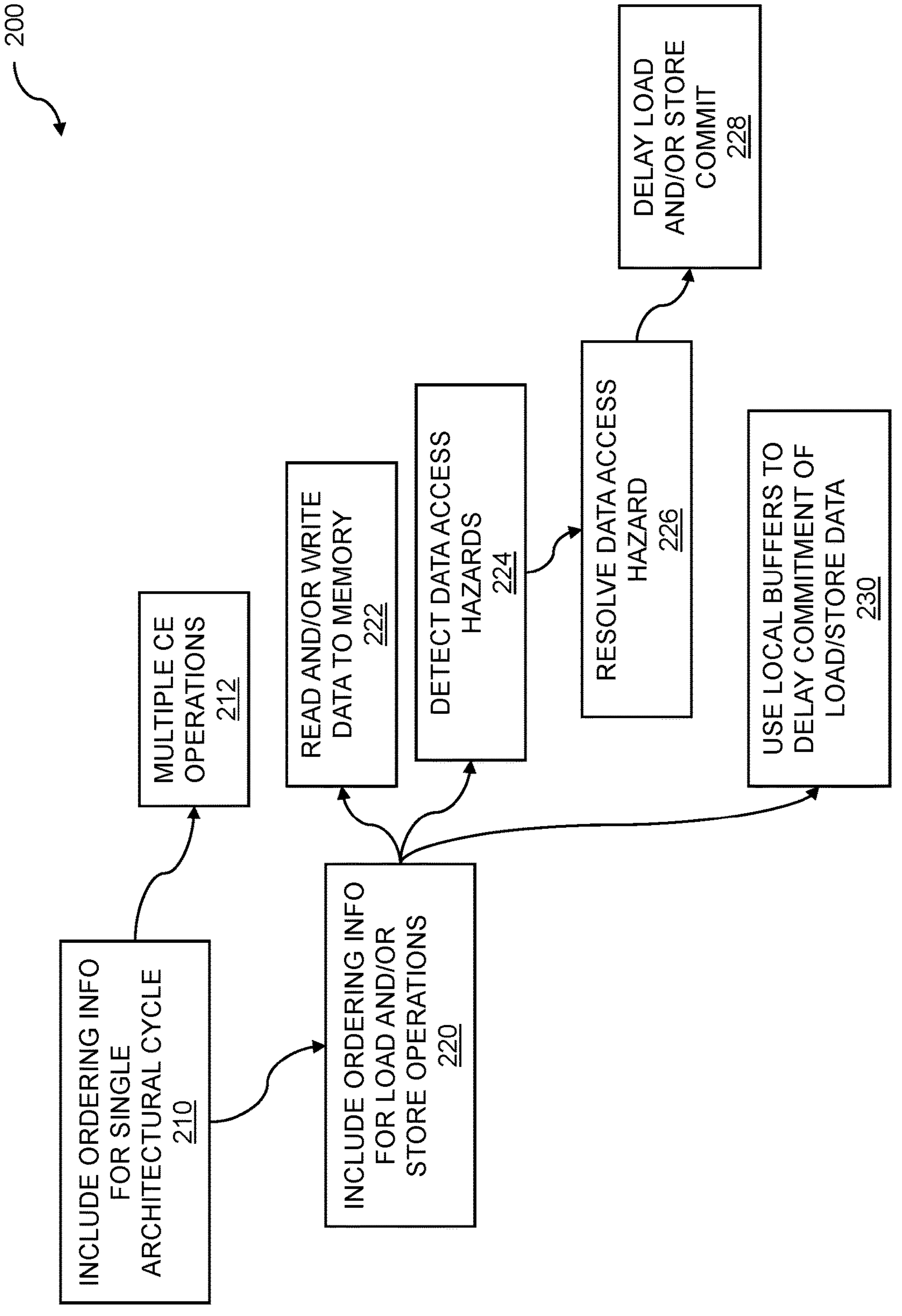
FIG. 2 is a flow diagram for ordering information usage.

FIG. 2 is a flow diagram for ordering information usage. A set of directions to hardware is provided through a control word. The control word is generated by a compiler, where the compiler can compile code for task processing. The hardware can include compute elements, supporting logic, and memory. The task processing is accomplished by executing the set of directions on a set of compute elements, where the compute elements can include elements within a two-dimensional array. Collections, clusters, or groupings of compute elements (CEs), such as CEs assembled within a 2D array of CEs, can be configured to execute a variety of operations associated with programs, codes, apps, and so on. The operations can be based on tasks, and subtasks that are associated with the tasks. The 2D array can further interface with other elements such as controllers, storage elements, ALUs, MMUs, GPUs, multiplier elements, convolvers, and the like. The operations can accomplish a variety of processing objectives such as application processing, data manipulation, design and simulation, modeling, and so on. The operations can perform manipulations of a variety of data types including integer, real, floating point, and character data types; vectors and matrices; tensors; etc. A two-dimensional (2D) array of compute elements is accessed, wherein each compute element within the array of compute elements is known to a compiler and is coupled to its neighboring compute elements within the array of compute elements, and wherein the array of compute elements is coupled to supporting logic and to memory, all of which together comprise compute hardware. A set of directions is provided to the hardware, through a control word generated by the compiler, for compute element operation and memory access precedence, wherein the set of directions includes ordering information. The ordering information enables the detection and mitigation of data hazards that is performed by the hardware. A compiled task is executed on the array of compute elements, based on the set of control words.

The control words can be stored in one or more associative memories, which can comprise a control word cache. By using the set of control words, a controller configures array elements such as compute elements, and enables execution of a compiled program such as a compiled task on the array. The compute elements can access registers, scratchpads, caches, and so on. The compute elements can further be designated in a topological set of compute elements (CEs). The topological set of CEs can implement one or more topologies, where a topology can be mapped by the compiler. The topology mapped by the compiler can include a graph such as a directed graph (DG) or directed acyclic graph (DAG), a Petri Net (PN), etc. In embodiments, the compiler maps machine learning functionality to the array of compute elements. The machine learning can be based on supervised, unsupervised, and semi-supervised learning; deep learning (DL); and the like. In embodiments, the machine learning functionality can include a neural network implementation. The compute elements can be coupled to other elements within the array of CEs. In embodiments, the coupling of the compute elements can enable one or more topologies. The other elements to which the CEs can be coupled can include storage elements such as one or more levels of cache storage, multiplier units, address generator units for generating load (LD) and store (ST) addresses, queues, and so on. The compiler to which each compute element is known can include a C, C++, or Python compiler. The compiler to which each compute element is known can include a compiler written especially for the array of compute elements. The coupling of each CE to its neighboring CEs enables sharing of elements such as cache elements, multiplier elements, ALU elements, or control elements; communication between or among neighboring CEs; and the like.

In the flow 200, ordering information includes ordering information 210 for a single architectural cycle. An architectural cycle can include operations such as data fetch, data modification, data write (e.g., read-modify-write), and so on. An architectural cycle, which can include a self-timed cycle, can reflect non-wall clock time, where wall clock time can include a duration of real time. The architectural cycle can include one or more operations. In the flow 200, the single architectural cycle can contain multiple compute element operations 212. The compute element operations can include arithmetic operations, logical operations, matrix operations, multiply-accumulate operations, tensor operations, etc. The compute element operations can include data access operations such as load and store operations. While the compiler can generate ordering information at compile time for an operation, the compiler cannot know memory access latencies, either from memory cache accesses due to bus contention, memory contention, and so on, or from more "distant" memory structures in the system such as a dynamic random access memory (DRAM) accesses, whose latencies can span hundreds of wall clock cycles.

In the flow 200, the ordering information includes data access ordering information 220 for load and/or store operations. A load operation can include reading data from storage, and a store operation can include writing data to storage. The data that is operated upon can be obtained from a cache, from local storage, from a register file, from remote storage, and so on. The ordering information 220 must be determined at runtime rather than compile time, due to various latencies, contentions, and memory access hazards as described previously. In embodiments, the data access ordering information is generated by the hardware during runtime. In the flow 200, the load and/or store operations can read and/or write data 222 to the memory. Noted previously, multiple compute element operations can occur within a cycle such as an architectural cycle. In order for the operations to be executed properly, the data on which the operations execute must be available at the time the operation is executed. The data can include data that was operated on prior to being made available to the current operation. As a result, the order of operations is critical. In the flow 200, the load and/or store ordering information can enable the hardware to detect data access hazards 224. A data access hazard can include attempting to perform two store operations to the same memory location, performing a load out of order (such as before a requisite store), and so on. In embodiments, the data access hazards can include write-after-read conflicts, read-after-write conflicts, write-after-write conflicts, and the like. The flow 200 further includes resolving a data access hazard 226 that was detected. Since storage can be shared by a plurality of elements such as compute elements, storage contention issues must be resolved such that data can be obtained with minimal delay, and a sufficient quantity of data must be obtained to reduce or eliminate the risk of the array stalling due to a lack of data to process. A variety of techniques can be used to resolve the data access hazard. In the flow 200, the resolution can include delaying 228 load and/or store committed reads and/or writes. The delaying can include performing no-op instructions, waiting for a "data ready" indication, etc. The flow 200 further includes using local buffers to delay commitment of the load and/or store data 230. The delay can be based on a number of cycles, a "data ready" indication, and the like. The local buffers can be implemented in each compute element's scratchpad memory.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
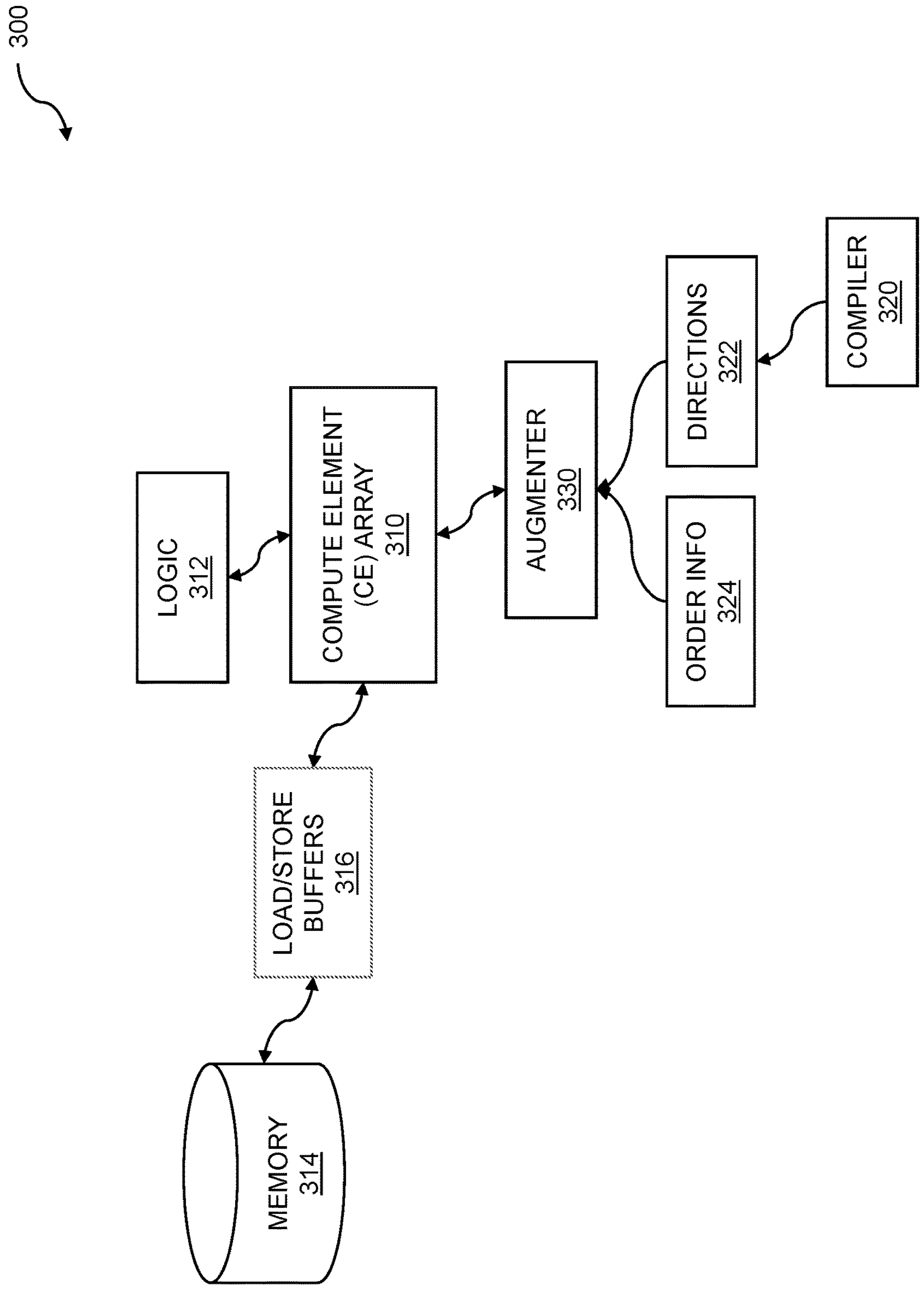
FIG. 3 is a system block diagram for out-of-order augmentation.

FIG. 3 is a system block diagram for out-of-order augmentation. Discussed previously, a set of directions can be provided to hardware comprising a two-dimensional array of compute elements, supporting logic, memory, and so on. The set of directions can provide ordering information, where the ordering information can include an order of execution of tasks and subtasks, an order for data access such as data reading and storing, and the like. The directions can take into account local data contention issues, preloading of data, transferring of data among compute elements, etc. The augmenting, which includes augmenting for out-of-order resolution, enables a highly parallel processing architecture. A two-dimensional array of compute elements is accessed. Each compute element within the array of compute elements is known to a compiler and is coupled to its neighboring compute elements within the array of compute elements. The array of compute elements is coupled to supporting logic and to memory, which, along with the array of compute elements, comprise compute hardware. A set of directions is provided to the hardware, through a control word generated by the compiler, for compute element operation. The set of directions is augmented with data access ordering information. The data access ordering is performed by the hardware. A compiled task is executed on the array of compute elements, based on the set of directions that was augmented.

The system block diagram 300 can include an array of compute elements 310. Each compute element within the array is known to a compiler and is coupled to its neighboring compute elements within the 2D array of compute elements. The compute elements within the 2D array of compute elements can include processors, central processing units (CPUs), graphics processing units (GPUs), coprocessors, and so on. The compute elements can be based on processing cores, where the processing cores can be configured within chips such as application specific integrated circuits (ASICs), processing cores programmed into programmable chips such as field programmable gate arrays (FPGAs), and so on. The compute elements can comprise a homogeneous array of compute elements. The system block diagram 300 can include logic 312 coupled to the array of compute elements. The logic can include supporting logic. The supporting logic can include control logic, where the control logic can use a control word generated by a compiler to configure the array, access data, execute data manipulations associated with tasks and subtask processing, etc. The supporting logic can include an arithmetic logic unit (ALU), a multiply-accumulate (MAC) unit, a matrix multiplier unit, a memory management unit (MMU), and the like.

The system block diagram 300 can include memory 314. The memory can include storage within the 2D array of compute elements such as a register file, a cache, an associative memory, and the like. The memory can include storage coupled to the 2D array, storage accessible to the 2D array, remote storage, etc. Data can be loaded from the memory, stored to the memory, and so on. In embodiments, data for the load and/or store is held in buffers. The system block diagram 300 can include load/store buffers 316. The load/store buffers can buffer data read from storage, data provided by the compute element array for writing to storage, and so on. The buffers can be used to hold data until the data can be accepted by one or more compute elements. The buffers further can be used to hold data until the data can be stored. Storing the data can include avoiding storage conflicts, hazards, and the like. In embodiments, the data held in buffers can be committed for writing after a data access hazard detection and mitigation window has expired. The load/store buffers can also be used for transferring data between compute elements, where the transferring can cross a cycle such as an architectural cycle of the 2D array of compute elements. In embodiments, the load and/or store operations can involve a temporal distance of more than one architectural cycle. Since sets or subsets of compute elements within the 2D array can be performing operations associated with different portions of tasks or subtasks, or different tasks and subtasks altogether, loading from or storing to memory can be delayed to further avoid race conditions, memory contention issues, hazards, and so on. Further embodiments can include using local buffers to delay commitment of the load and/or store data.

The system block diagram 300 can include a compiler 320. The compiler can include a high-level compiler such as a C, C++, Python, or similar compiler. The compiler can include a hardware description language compiler such as a VHDL™ or Verilog™ compiler. The compiler can include a compiler for a portable, language-independent, intermediate representation such as low-level virtual machine (LLVM) intermediate representation (IR). The compiler can generate a set of directions based on control words. The control words can represent a circuit topology. A circuit topology can include a systolic, a vector, a cyclic, a spatial, a streaming, or a Very Long Instruction Word (VLIW) topology, a neural network topology, etc. The compiler can be used to compile tasks, subtasks, and so on. The tasks and subtasks can be based on a processing application. The compiler can generate directions 322 for handling compute element results. The compute element results can include results derived from arithmetic, vector, array, and matrix operations; Boolean operations; and so on. The generated set of directions can include ordering information 324. The ordering information can describe an order in which tasks, subtasks, processes, subprocesses, and so on are executed. The ordering information can include an order of operations for processes, tasks, subtasks, etc. The ordering information can include an order for storage accesses, and the like. In embodiments, the ordering information can include ordering information for load and/or store operations. In a usage example a second task accesses data generated by a first task. In order for the task processing to proceed correctly, a data read requested by the second process must occur after the first process has written its output data. In embodiments, the load and/or store ordering information can enable the hardware to detect data access hazards. A data access hazard can include performing two different writes to the same memory location at substantially the same time; or performing a read operation on a memory location before a write operation to the same memory location at substantially the same time has completed. In embodiments, the data access hazards can include write-after-read, read-after-write, and write-after-write conflicts.

The system block diagram can include an augmenter 330. The augmenter can augment or transform the set of directions to include the ordering information. The augmenting can include the compiler identifying operations that can be executed in parallel with or independently from other operations to be executed by compute elements within the 2D array of compute elements. The augmenting can include adding or removing directions in order to enable parallel operations. The retiming can include delaying commitment of data, where commitment of data can include loading data from memory, storing data to memory, etc. The augmented control word is executed by the hardware. The hardware can include the 2D array of compute elements, the supporting logic, the memory, the load/store buffers, and so on. The performing the ordering as specified by the augmenting control word is accomplished by the hardware. This enables the ordering to be performed locally or "on chip", that is, not under the explicit control of the compiler. The execution by the hardware can take into account idiosyncrasies of the compute elements, low-level memory contention issues, etc. without requiring the compiler to control such indeterminate processes such as variable memory latency.

FIG. 4 illustrates a system block diagram for a highly parallel architecture with a shallow pipeline. The highly parallel architecture can comprise components including compute elements, processing elements, buffers, one or more levels of cache storage, system management, arithmetic logic units, multipliers, memory management units, and so on. The various components can be used to accomplish task processing, where the task processing is associated with program execution, job processing, etc. The task processing is enabled based on compute element processing using control word templates. One or more control word templates are generated for use in a two-dimensional (2D) array of compute elements, wherein each compute element within the array of compute elements is known to a compiler and is coupled to its neighboring compute elements within the 2D array of compute elements, and wherein each control word template designates a topological set of compute elements from the 2D array of compute elements. The one or more control word templates are customized with a specific set of compute element operations. The specific set of compute element operations is executed on the topological set of compute elements.

A system block diagram 400 for a highly parallel architecture with a shallow pipeline is shown. The system block diagram can include a compute element array 410. The compute element array 410 can be based on compute elements, where the compute elements can include processors, central processing units (CPUs), graphics processing units (GPUs), coprocessors, and so on. The compute elements can be based on processing cores configured within chips such as application specific integrated circuits (ASICs), processing cores programmed into programmable chips such as field programmable gate arrays (FPGAs), and so on. The compute elements can comprise a homogeneous array of compute elements. The system block diagram 400 can include translation and look-aside buffers such as translation and look-aside buffers 412 and 438. The translation and look-aside buffers can comprise memory caches, where the memory caches can be used to reduce storage access times.

The system block diagram 400 can include logic for load and store access order and selection. The logic for load and store access order and selection can include crossbar switch and logic 415 along with crossbar switch and logic 442. Crossbar switch and logic 415 can accomplish load and store access order and selection for the lower data cache blocks (418 and 420), and crossbar switch and logic 442 can accomplish load and store access order and selection for the upper data cache blocks (444 and 446). Crossbar switch and logic 415 enables high-speed data communication between the lower-half compute elements of compute element array 410 and data caches 418 and 420 using access buffers 416. Crossbar switch and logic 442 enables high-speed data communication between the upper-half compute elements of compute element array 410 and data caches 444 and 446 using access buffers 443. The access buffers 416 and 443 allow logic 415 and logic 442, respectively, to hold, load, or store data until any memory hazards are resolved. In addition, splitting the data cache between physically adjacent regions of the compute element array can enable the doubling of load access bandwidth, the reducing of interconnect complexity, and so on. While loads can be split, stores can be driven to both lower data caches 418 and 420 and upper data caches 444 and 446.

The system block diagram 400 can include lower load buffers 414 and upper load buffers 441. The load buffers can provide temporary storage for memory load data so that it is ready for low latency access by the compute element array 410. The system block diagram can include dual level 1 (L1) data caches, such as L1 data caches 418 and 444. The L1 data caches can be used to hold blocks of load and/or store data, such as data to be processed together, data to be processed sequentially, and so on. The L1 cache can include a small, fast memory that is quickly accessible by the compute elements and other components. The system block diagram can include level 2 (L2) data caches. The L2 caches can include L2 caches 420 and 446. The L2 caches can include larger, slower storage in comparison to the L1 caches. The L2 caches can store "next up" data, results such as intermediate results, and so on. The L1 and L2 caches can further be coupled to level 3 (L3) caches. The L3 caches can include L3 caches 422 and 448. The L3 caches can be larger than the L2 and L1 caches and can include slower storage. Accessing data from L3 caches is still faster than accessing main storage. In embodiments, the L1, L2, and L3 caches can include 4-way set associative caches.

The system block diagram 400 can include lower multiplier element 413 and upper multiplier element 440. The multiplier elements can provide an efficient multiplication function of data coming out of the compute element array and/or data moving into the compute element array. Multiplier element 413 can be coupled to the compute element array 410 and load buffers 414, and multiplier element 440 can be coupled to compute element array 410 and load buffers 441.

The system block diagram 400 can include a system management buffer 424. The system management buffer can be used to store system management codes or control words that can be used to control the array 410 of compute elements. The system management buffer can be employed for holding opcodes, codes, routines, functions, etc. which can be used for exception or error handling, management of the parallel architecture for processing tasks, and so on. The system management buffer can be coupled to a decompressor 426. The decompressor can be used to decompress system management compressed control words (CCWs) from system management compressed control word buffer 428 and can store the decompressed system management control words in the system management buffer 424. The compressed system management control words can require less storage than the uncompressed control words. The system management CCW component 428 can also include a spill buffer. The spill buffer can comprise a large static random-access memory (SRAM) which can be used to support multiple nested levels of exceptions.

The compute elements within the array of compute elements can be controlled by a control unit such as control unit 430. While the compiler, through the control word, controls the individual elements, the control unit can pause the array to ensure that new control words are not driven into the array. The control unit can receive a decompressed control word from a decompressor 432 and can drive out the decompressed control word into the appropriate compute elements of compute element array 410. The decompressor can decompress a control word (discussed below) to enable or idle rows or columns of compute elements, to enable or idle individual compute elements, to transmit control words to individual compute elements, etc. The decompressor can be coupled to a compressed control word store such as compressed control word cache 1 (CCWC1) 434. CCWC1 can include a cache such as an L1 cache that includes one or more compressed control words. CCWC1 can be coupled to a further compressed control word store such as compressed control word cache 2 (CCWC2) 436. CCWC2 can be used as an L2 cache for compressed control words. CCWC2 can be larger and slower than CCWC1. In embodiments, CCWC1 and CCWC2 can include 4-way set associativity. In embodiments, the CCWC1 cache can contain decompressed control words, in which case it could be designated as DCWC1. In that case, decompressor 432 can be coupled between CCWC1 434 (now DCWC1) and CCWC2 436.

Figure 5:
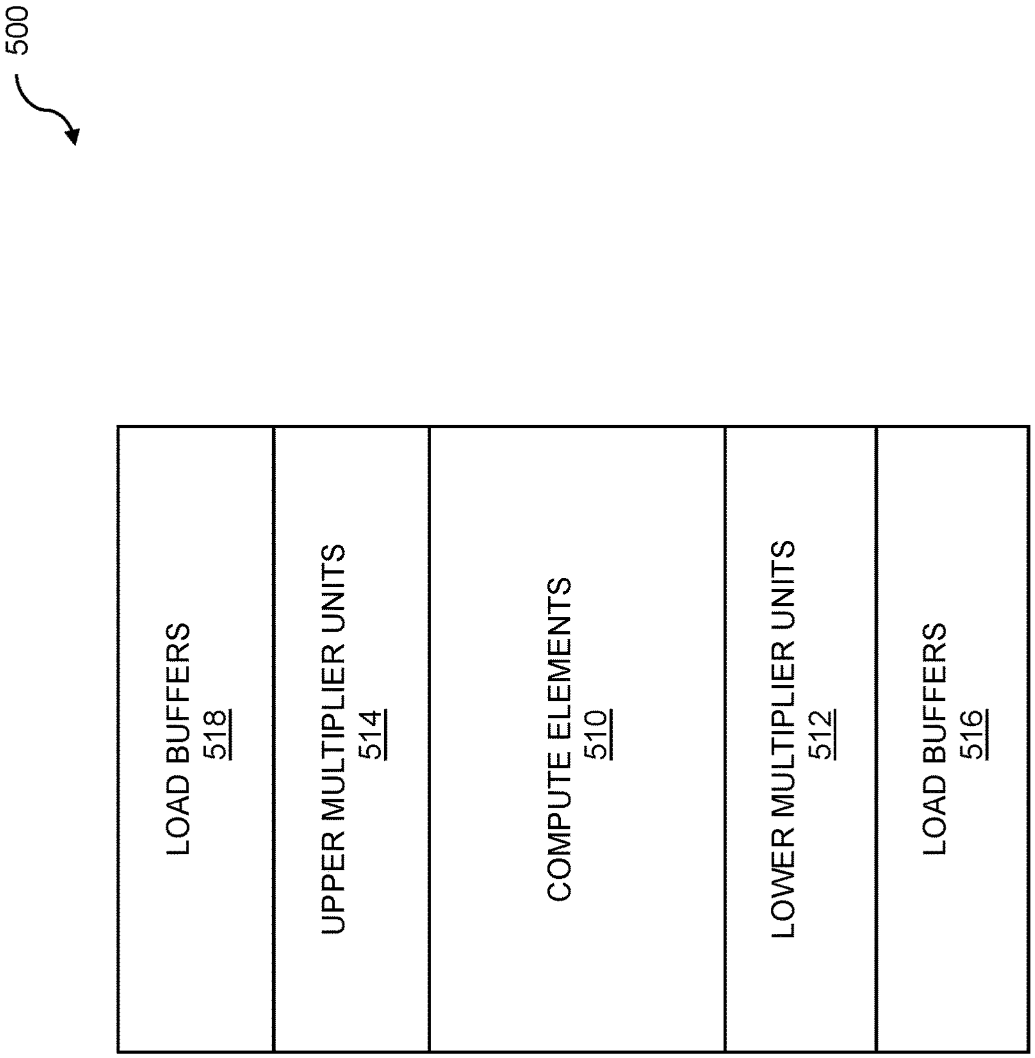
FIG. 5 shows compute element array detail.

FIG. 5 shows compute element array detail 500. A compute element array can be coupled to components which enable the compute elements within the array to process one or more tasks, subtasks, and so on. The components can access and provide data, perform specific high-speed operations, and the like. The compute element array and its associated components enable a highly parallel processing architecture with out-of-order resolution. The compute element array 510 can perform a variety of processing tasks, where the processing tasks can include operations such as arithmetic, vector, matrix, or tensor operations; audio and video processing operations; neural network operations; etc. The compute elements can be coupled to multiplier units such as lower multiplier units 512 and upper multiplier units 514. The multiplier units can be used to perform high-speed multiplications associated with general processing tasks, multiplications associated with neural networks such as deep learning networks, multiplications associated with vector operations, and the like. The compute elements can be coupled to load buffers such as load buffers 516 and load buffers 518. The load buffers can be coupled to the L1 data caches as discussed previously. In embodiments, a crossbar switch (not shown) can be coupled between the load buffers and the data caches. The load buffers can be used to load storage access requests from the compute elements. The load buffers can track expected load latencies and can notify a control unit if a load latency exceeds a threshold. Notification of the control unit can be used to signal that a load may not arrive within an expected timeframe. The load buffers can further be used to pause the array of compute elements. The load buffers can send a pause request to the control unit that will pause the entire array, while individual elements can be idled under control of the control word. When an element is not explicitly controlled, it can be placed in the idle (or low power) state. No operation is performed, but ring buses can continue to operate in a "pass thru" mode to allow the rest of the array to operate properly. When a compute element is used just to route data unchanged through its ALU, it is still considered active.

While the array of compute elements is paused, background loading of the array from the memories (data memory and control word memory) can be performed. The memory systems can be free running and can continue to operate while the array is paused. Because multi-cycle latency can occur due to control signal transport that results in additional "dead time", allowing the memory system to "reach into" the array and to deliver load data to appropriate scratchpad memories can be beneficial while the array is paused. This mechanism can operate such that the array state is known, as far as the compiler is concerned. When array operation resumes after a pause, new load data will have arrived at a scratchpad, as required for the compiler to maintain the statically scheduled model.

Figure 6:
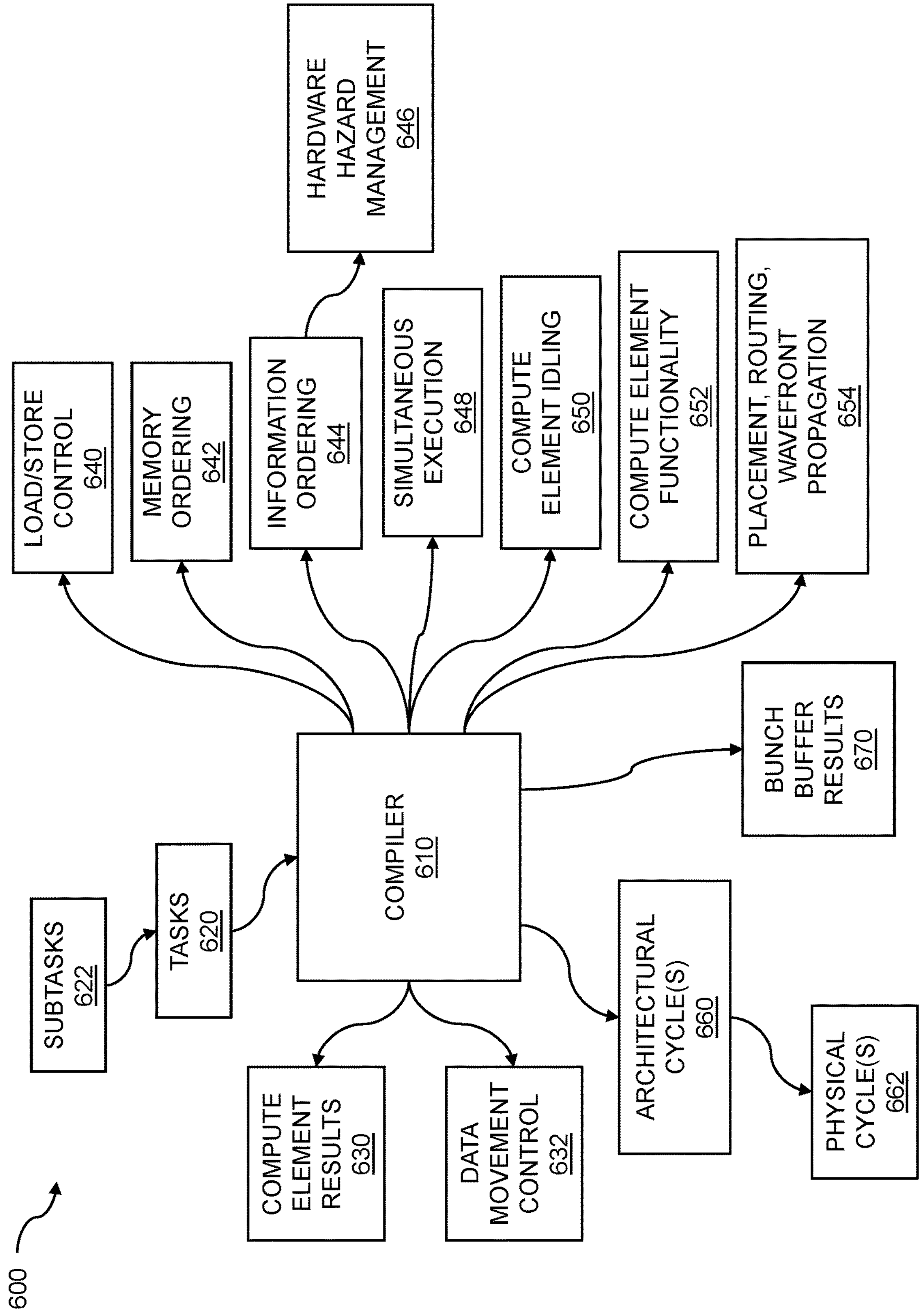
FIG. 6 illustrates a system block diagram for compiler interactions.

FIG. 6 illustrates a system block diagram for compiler interactions. Discussed throughout, compute elements within a 2D array are known to a compiler which can compile tasks and subtasks for execution on the array. The compiled tasks and subtasks are executed on one or more compute elements to accomplish task processing. The executing compiled tasks is based on a set of directions that has been augmented to comply with ordering information. The execution of the augmented set of directions is performed by the compute hardware which includes the 2D array of compute elements, supporting logic, and memory. A variety of interactions, such as configuration of compute elements, placement of tasks, routing of data, and so on, can be associated with the compiler. The compiler interactions enable a highly parallel processing architecture with out-of-order resolution. A two-dimensional array of compute elements is accessed. Each compute element within the array of compute elements is known to a compiler and is coupled to its neighboring compute elements within the array of compute elements. The array of compute elements is coupled to supporting logic and to memory, which, along with the array of compute elements, comprise compute hardware. A set of directions is provided to the hardware, through a control word generated by the compiler, for compute element operation. The set of directions is augmented with data access ordering information. The data access ordering is performed by the hardware. A compiled task is executed on the array of compute elements, based on the set of directions that was augmented.

The system block diagram 600 includes a compiler 610. The compiler can include a high-level compiler such as a C, C++, Python, or similar compiler. The compiler can include a compiler implemented for a hardware description language such as a VHDL™ or Verilog™ compiler. The compiler can include a compiler for a portable, language-independent, intermediate representation such as low-level virtual machine (LLVM) intermediate representation (IR). The compiler can generate a set of directions that can be provided to the compute elements and other elements within the array. The compiler can be used to compile tasks 620. The tasks can include a plurality of tasks associated with a processing task. The tasks can further include a plurality of subtasks 622. The tasks can be based on an application such as a video processing or audio processing application. In embodiments, the tasks can be associated with machine learning functionality. The compiler can generate directions for handling compute element results 630. The compute element results can include results derived from arithmetic, vector, array, and matrix operations; Boolean operations; and so on. In embodiments, the compute element results are generated in parallel in the array of compute elements. Parallel results can be generated by compute elements when the compute elements can share input data, use independent data, and the like. The compiler can generate a set of directions that controls data movement 632 for the array of compute elements. The control of data movement can include movement of data to, from, and among compute elements within the array of compute elements. The control of data movement can include loading and storing data, such as temporary data storage, during data movement. In other embodiments, the data movement can include intra-array data movement.

As with a general-purpose compiler used for generating tasks and subtasks for execution on one or more processors, the compiler can provide directions for task and subtask handling, input data handling, intermediate and final result data handling, and so on. The compiler can further generate directions for configuring the compute elements, storage elements, control units, ALUs, and so on, associated with the array. As previously discussed, the compiler generates directions for data handling to support the task handling. In the system block diagram, the data movement can include control of data loads and stores 640 with a memory array. The loads and stores can include handling various data types such as integer, real or float, double-precision, character, and other data types. The loads and stores can load and store data into local storage such as registers, register files, caches, and the like. The caches can include one or more levels of cache such as a level 1 (L1) cache, level 2 (L2) cache, level 3 (L3) cache, and so on. The loads and stores can also be associated with storage such as shared memory, distributed memory, etc. In addition to the loads and stores, the compiler can handle other memory and storage management operations including memory precedence. In the system block diagram, the memory access precedence can enable ordering of memory data 642. Memory data access can be ordered based on task data requirements, subtask data requirements, task priority or precedence, and so on. The memory data access ordering can enable parallel execution of tasks and subtasks.

In the system block diagram 600, the ordering of memory data accesses can enable information ordering 644. In embodiments, the information ordering can include compute element result sequencing. In order for task processing to be accomplished successfully, tasks and subtasks must be executed in an order that can accommodate task priority, task precedence, a schedule of operations, and so on. The memory data access can be ordered such that the data required by the tasks and subtasks can be available for processing when the tasks and subtasks are scheduled to be executed. The results of the processing of the data by the tasks and subtasks can therefore be ordered to optimize task execution, to reduce or eliminate memory contention conflicts, etc. The system block diagram includes hardware hazard management 646. The hardware hazard management can include using compute hardware, which includes the 2D array of compute elements, supporting logic, and memory, to implement the set of data access priorities, based on the augmented set of directions.

The system block diagram includes enabling simultaneous execution 648 of two or more potential compiled task outcomes based on the set of directions. The code that is compiled by the compiler can include branch points, where the branch points can include computations or flow control. Flow control transfers program execution to a different sequence of control words. Since the result of a branch decision, for example, is not known apriori, the initial operations associated with both paths are encoded in the currently executing control word stream. When the correct result of the branch is determined, then the sequence of control words associated with the correct branch result continues execution, while the operations for the branch path not taken are halted and side effects may be flushed. In embodiments, the two or more potential branch paths can be executed on spatially separate compute elements within the array of compute elements.

The system block diagram includes compute element idling 650. In embodiments, the set of directions from the compiler can idle an unneeded compute element within a row of compute elements located in the array of compute elements. Not all of the compute elements may be needed for processing, depending on the tasks, subtasks, and so on that are being processed. The compute elements may not be needed simply because there are fewer tasks to execute than there are compute elements available within the array. In embodiments, the idling can be controlled by a single bit in the control word generated by the compiler. In the system block diagram, compute elements within the array can be configured for various compute element functionalities 652. The compute element functionality can enable various types of computer architectures, processing configurations, and the like. In embodiments, the set of directions can enable machine learning functionality. The machine learning functionality can be trained to process various types of data such as image data, audio data, medical data, etc. In embodiments, the machine learning functionality can include neural network implementation. The neural network can include a convolutional neural network, a recurrent neural network, a deep learning network, and the like. The system block diagram can include compute element placement, results routing, and computation wave-front propagation 654 within the array of compute elements. The compiler can generate directions or instructions that can place tasks and subtasks on compute elements within the array. The placement can include placing tasks and subtasks based on data dependencies between or among the tasks or subtasks, placing tasks that avoid memory conflicts or communications conflicts, etc. The directions can also enable computation wave-front propagation. Computation wave-front propagation can implement and control how execution of tasks and subtasks proceeds through the array of compute elements.

In the system block diagram, the compiler can control architectural cycles 660. An architectural cycle can include an abstract cycle that is associated with the elements within the array of elements. The elements of the array can include compute elements, storage elements, control elements, ALUs, and so on. An architectural cycle can include an "abstract" cycle, where an abstract cycle can refer to a variety of architecture level operations such as a load cycle, an execute cycle, a write cycle, and so on. The architectural cycles can refer to macro-operations of the architecture rather than to low level operations. One or more architectural cycles are controlled by the compiler. Execution of an architectural cycle can be dependent on two or more conditions. In embodiments, an architectural cycle can occur when a control word is available to be pipelined into the array of compute elements and when all data dependencies are met. That is, the array of compute elements does not have to wait for either dependent data to load or for a full memory queue to clear. In the system block diagram, the architectural cycle can include one or more physical cycles 662. A physical cycle can refer to one or more cycles at the element level that are required to implement a load, an execute, a write, and so on. In embodiments, the set of directions can control the array of compute elements on a physical cycle-by-cycle basis. The physical cycles can be based on a clock such as a local, module, or system clock, or some other timing or synchronizing technique. In embodiments, the physical cycle-by-cycle basis can include an architectural cycle. The physical cycles can be based on an enable signal for each element of the array of elements, while the architectural cycle can be based on a global, architectural signal. In embodiments, the compiler can provide, via the control word, valid bits for each column of the array of compute elements, on the cycle-by-cycle basis. A valid bit can indicate that data is valid and ready for processing, that an address such as a jump address is valid, and the like. In embodiments, the valid bits can indicate that a valid memory load access is emerging from the array. The valid memory load access from the array can be used to access data within a memory or storage element. In other embodiments, the compiler can provide, via the control word, operand size information for each column of the array of compute elements. Various operand sizes can be used. In embodiments, the operand size can include bytes, half-words, words, and double-words.

The control word bits can include a control word bunch. A control word bunch can include a subset of bits in a control word. In embodiments, the control word bunch can provide operational control of a particular compute element, a multiplier unit, and so on. Buffers, or "bunch buffers" can be placed at each control element. In embodiments, the bunch buffers can hold a number of bunches, such as 16 bunches. Other numbers of bunches, such as 8, 32, 64 bunches, and so on, can also be used. In the system block diagram, the compiler can control what to do with bunch buffer results 670. The results of a bunch buffer can be stored in local scratchpad memory, can be stored in global memory, can control an associated compute element or multiplier element, can be used in another compute element, etc. In embodiments, an iteration counter can be associated with each bunch buffer. The interaction counter can be used to control a number of times that the bits within the bunch buffer are cycled through. In further embodiments, a bunch buffer pointer can be associated with each bunch buffer. The bunch buffer counter can be used to indicate or "point to" the next bunch of control word bits to apply to the compute element or multiplier element. In embodiments, data paths associated with the bunch buffers can be balanced during a compile time associated with processing tasks, subtasks, and so on. The balancing the data paths can enable compute elements to operate without the risk of a single compute element being starved for data, which could result in stalling the two-dimensional array of compute elements as data is obtained for the compute element. Further, the balancing the data paths can enable an autonomous operation technique. In embodiments, the autonomous operation technique can include a dataflow technique.

Figure 7:
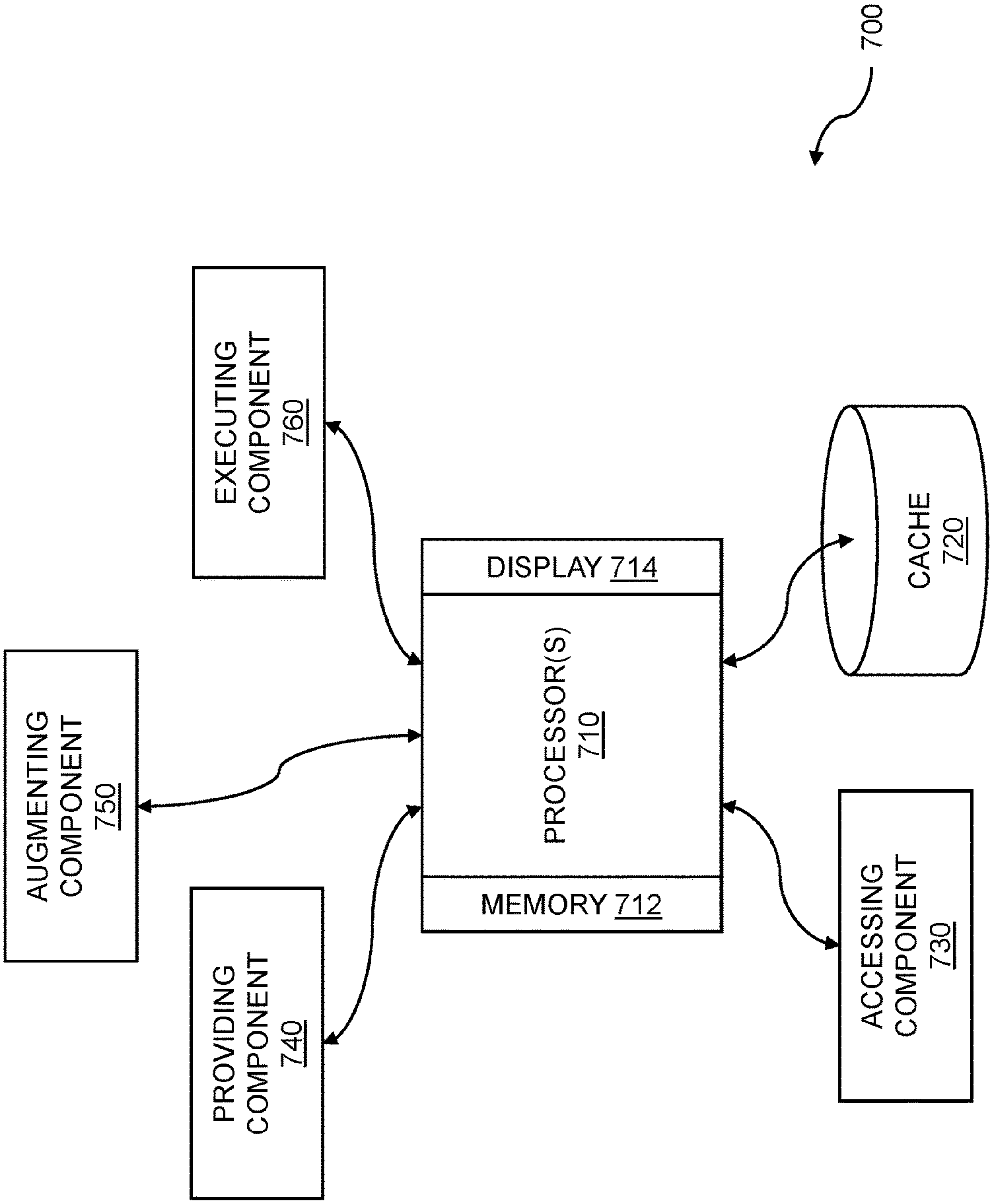
FIG. 7 is a system diagram for a highly parallel processing architecture with out-of-order resolution.

FIG. 7 is a system diagram for a highly parallel processing architecture with out-of-order resolution. The highly parallel processing architecture with out-of-order resolution accomplishes task processing. The system 700 can include one or more processors 710, which are attached to a memory 712 which stores instructions. The system 700 can further include a display 714 coupled to the one or more processors 710 for displaying data; intermediate steps; directions; augmented directions; control words; control word templates; customized control word templates; compressed control words; control words implementing Very Long Instruction Word (VLIW) functionality; topologies including systolic, vector, cyclic, spatial, streaming, or VLIW topologies; and so on. In embodiments, one or more processors 710 are coupled to the memory 712, wherein the one or more processors, when executing the instructions which are stored, are configured to: access a two-dimensional array of compute elements, wherein each compute element within the array of compute elements is known to a compiler and is coupled to its neighboring compute elements within the array of compute elements, and wherein the array of compute elements is coupled to supporting logic and to memory, which together with the array of compute elements comprises compute hardware; provide a set of directions to the hardware, through a control word generated by the compiler, for compute element operation; augment the set of directions with data access ordering information, wherein data access ordering is performed by the compute hardware; and execute a compiled task on the array of compute elements, based on the set of directions that was augmented. The compute elements can include compute elements within one or more integrated circuits or chips, compute elements or cores configured within one or more programmable chips such as application specific integrated circuits (ASICs), field programmable gate arrays (FPGAs), heterogeneous processors configured as a mesh, standalone processors, etc.

The system 700 can include a cache 720. The cache 720 can be used to store data such as scratchpad data, operations that support a balanced number of execution cycles for a data-dependent branch, directions to compute elements, augmented sets of directions, control words, control word templates that are customized with a specific set of compute element operations, intermediate results, microcode, branch decisions, and so on. The cache can comprise a small, local, easily accessible memory available to one or more compute elements. In embodiments, the data that is stored can include preloaded data that can enable load latency amelioration. The data within the cache can include data required to support dataflow processing by statically scheduled compute elements within the 2D array of compute elements. The cache can be accessed by one or more compute elements. The cache, if present, can include a dual read, single write (2R1W) cache. That is, the 2R1W cache can enable two read operations and one write operation contemporaneously without the read and write operations interfering with one another.

The system 700 can include an accessing component 730. The accessing component 730 can include control logic and functions for accessing a two-dimensional (2D) array of compute elements. Each compute element within the array of compute elements is known to a compiler and is coupled to its neighboring compute elements within the array of compute elements. A compute element can include one or more processors, processor cores, processor macros, processor cells, and so on. Each compute element can include an amount of local storage. The local storage may be accessible by one or more compute elements. Each compute element can communicate with neighbors, where the neighbors can include nearest neighbors or more remote "neighbors". Communication between and among compute elements can be accomplished using a bus such as an industry standard bus, a ring bus, a network such as a wired or wireless computer network, etc. In embodiments, the ring bus is implemented as a distributed multiplexor (MUX). The array of compute elements is coupled to supporting logic and to memory, all of which together comprise compute hardware.

The system 700 can include a providing component 740. The providing component 740 can include control logic and functions for providing a set of directions to the hardware. The directions can be used to configure compute elements, to perform operations on data, and so on. The directions can be provided or specified through a control word generated by the compiler. In embodiments, the control word specifies operations for the array of compute elements. The compiler can include a high-level compiler such as a Python, C++, or C compiler, a hardware-specific compiler such as a Verilog or VHDL compiler, a compiler specifically for use with the 2D array of compute elements, and the like. The directions can accomplish compute element operation and memory access precedence. The compute element operations can include arithmetic operations, logical operations, multiply-accumulate operations, matrix operations, etc. The memory access precedence can include minimizing memory access delay, contention, etc. The set of directions includes ordering information. The ordering information can include ordering of control word execution, ordering of memory access, etc.

The operations that are provided by the control words can be specified on a physical cycle-by-cycle basis. The operations can include read-modify-write operations. In embodiments, the physical cycle-by-cycle can include an architectural cycle. An architectural cycle can include providing one or more control words, decoding the control words, configuring one or more compute elements, and the like. In embodiments, the control can be enabled by a stream of wide, variable length, control words generated by the compiler. The control words can be based on low-level control words such as assembly language words, microcode words, and so on. The control can be based on bits, where control word bits comprise a control word bunch (described shortly below). The control of the array of compute elements on a cycle-by-cycle basis can include configuring the array to perform various compute operations. In embodiments, the stream of wide, variable length, control words generated by the compiler provide direct, fine-grained control of the 2D array of compute elements. The compute operations can enable audio or video processing, artificial intelligence processing, and the like. In embodiments, the set of directions can enable machine learning functionality. The machine learning functionality can include deep learning functionality. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. A control can enable machine learning functionality for the neural network topology.

A compute element can include one or more processors, processor cores, processor macros, processor cells, and so on. Each compute element can include an amount of local storage. The local storage may be accessible by one or more compute elements. Each compute element can communicate with neighbors, where the neighbors can include nearest neighbors or more remote "neighbors". Communication between and among compute elements can be accomplished using a bus such as an industry standard bus, a ring bus, a network such as a wired or wireless computer network, etc. In embodiments, the ring bus is implemented as a distributed multiplexor (MUX). A topological set of compute elements can include a subset of compute elements within the 2D array of compute elements. The topological set can include a set of interconnections between the set of compute elements. A topology can be implemented to perform specific tasks or operations.

The system 700 can include an augmenting component 750. The augmenting component 750 can include control and functions for augmenting the control word to include a set of directions or hints that allow the hardware to comply with the ordering information data access requirements. The compiler can provide directions at a high level, such as a task or subtask level. The directions can include fetching data, processing data, storing data, and so on. The augmenting can be used to ensure that the directions provided by the compiler are executed so as to comply with the ordering information and avoid data access hazards. The augmenting can further reduce or eliminate memory contention issues, timing issues such as reading data before the data has been updated, and the like. In embodiments, an associative memory can be included in each compute element of the set of compute elements. The associative memory can include a small, fast memory, a register file, etc. The associative memory can store customized control word templates.

The system block diagram 700 can include an executing component 760. The executing component 760 can include control and functions for executing a compiled task on the array of compute elements, based on the set of control words. The compiled tasks can include one or more compiled subtasks. The operations associated with tasks, subtasks, and so on can include arithmetic operations, Boolean operations, matrix operations, neural network operations, and the like. The operations can be executed based on the specific set of compute element operations. The specific set of compute element operations can be generated by the compiler. The control words associated with the set of directions can be provided to a control unit, where the control unit can control the operations of the compute elements within the array of compute elements. Operation of the compute elements can include configuring the compute elements, providing data to the compute elements, routing and ordering results from the compute elements, and so on. In embodiments, the specific set of compute element operations associated with control words can be executed on a given cycle across the array of compute elements. The set of compute element operations can provide control to the set of compute elements on a per compute element basis, where each control word can be comprised of a plurality of compute element control groups, clusters, and so on.

The executing operations contained in one or more specific sets of compute element operations can include distributed execution of operations. In embodiments, the distributed execution of operations can occur in two or more compute elements within the array of compute elements. The executing operations can include storage access, where the storage can include a scratchpad memory, one or more caches, register files, etc., within the 2D array of compute elements. Further embodiments include a memory operation outside of the array of compute elements. The "outside" memory operation can include access to a memory such as a high-speed memory, a shared memory, remote memory, etc. In embodiments, the memory operation can be enabled by autonomous compute element operation. Data operations can be performed by a topological set of compute elements without loading further control words for a number of cycles. The autonomous compute element operation can be based on operation looping. In embodiments, the operation looping can accomplish dataflow processing within statically scheduled compute elements. Dataflow processing can include processing based on the presence or absence of data. The dataflow processing can be performed without requiring access to external storage. Discussed above and throughout, the executing can occur on an architectural cycle basis. An architectural basis can include a compute element cycle. In embodiments, the architectural cycle basis can reflect non-wall clock, compiler time.

The system 700 can include a computer program product embodied in a non-transitory computer readable medium for task processing, the computer program product comprising code which causes one or more processors to perform operations of: accessing a two-dimensional array of compute elements, wherein each compute element within the array of compute elements is known to a compiler and is coupled to its neighboring compute elements within the array of compute elements, and wherein the array of compute elements is coupled to supporting logic and to memory, which together with the array of compute elements comprises compute hardware; providing a set of directions to the hardware, through a control word generated by the compiler, for compute element operation; augmenting the set of directions with data access ordering information, wherein data access ordering is performed by the compute hardware; and executing a compiled task on the array of compute elements, based on the set of directions that was augmented.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions-generally referred to herein as a “circuit,” “module,” or “system” may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs “execute” and “process” may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for task processing comprising:

accessing a two-dimensional array of compute elements, wherein each compute element within the array of compute elements is known to a compiler and is coupled to its neighboring compute elements within the array of compute elements, and wherein the array of compute elements is coupled to supporting logic and to memory, which together with the array of compute elements comprises compute hardware;

providing a set of directions to the hardware, through a control word generated by the compiler, for compute element operation;

augmenting the set of directions with data access ordering information, wherein data access ordering is performed by the compute hardware, wherein the ordering information includes ordering information for a single architectural cycle, wherein the single architectural cycle contains multiple compute element operations; and executing a compiled task on the array of compute elements, based on the set of directions that was augmented.

2. The method of claim 1 wherein the ordering information includes ordering information for load and/or store operations.

3. The method of claim 2 wherein the load and/or store operations read and/or write data to the memory.

4. The method of claim 2 wherein the load and/or store ordering information enables the hardware to detect data access hazards.

5. The method of claim 4 wherein the data access hazards include write-after-read, read-after-write, and write-after-write conflicts.

6. The method of claim 4 further comprising resolving a data access hazard that was detected.

7. The method of claim 6 wherein the resolving includes delaying loads and/or stores.

8. The method of claim 7 wherein data for the load and/or store is held in buffers.

9. The method of claim 8 wherein the data held in buffers is committed after the data access hazard detection and mitigation window has expired.

10. The method of claim 2 wherein the load and/or store operations involve a temporal distance of more than one architectural cycle.

11. The method of claim 10 further comprising using local buffers to delay commitment of data for the load and/or store operations.

12. The method of claim 11 wherein the data for load operations is read from the memory.

13. The method of claim 11 wherein the data for store operations is written to the memory.

14. The method of claim 1 wherein the compute hardware ensures semantic correctness of operations to the memory.

15. The method of claim 1 wherein the data access ordering enables ordering of memory data.

16. The method of claim 15 wherein the ordering of memory data enables compute element result sequencing.

17. The method of claim 1 wherein the control word specifies operations for the array of compute elements.

18. The method of claim 17 wherein the operations are specified on a physical cycle-by-cycle basis.

19. The method of claim 18 wherein the physical cycle-by-cycle basis comprises an architectural cycle.

20. The method of claim 1 wherein the data access ordering information is generated by the hardware during runtime.

21. A computer program product embodied in a non-transitory computer readable medium for task processing, the computer program product comprising code which causes one or more processors to perform operations of:

accessing a two-dimensional array of compute elements, wherein each compute element within the array of compute elements is known to a compiler and is coupled to its neighboring compute elements within the array of compute elements, and wherein the array of compute elements is coupled to supporting logic and to memory, which together with the array of compute elements comprises compute hardware;

providing a set of directions to the hardware, through a control word generated by the compiler, for compute element operation;

augmenting the set of directions with data access ordering information, wherein data access ordering is performed by the compute hardware, wherein the ordering information includes ordering information for a single architectural cycle, wherein the single architectural cycle contains multiple compute element operations; and executing a compiled task on the array of compute elements, based on the set of directions that was augmented.

22. A computer system for task processing comprising:

a memory which stores instructions;

one or more processors coupled to the memory, wherein the one or more processors, when executing the instructions which are stored, are configured to:

access a two-dimensional array of compute elements, wherein each compute element within the array of compute elements is known to a compiler and is coupled to its neighboring compute elements within the array of compute elements, and wherein the array of compute elements is coupled to supporting logic and to memory, which together with the array of compute elements comprises compute hardware;

provide a set of directions to the hardware, through a control word generated by the compiler, for compute element operation;

augment the set of directions with data access ordering information, wherein data access ordering is performed by the compute hardware, wherein the ordering information includes ordering information for a single architectural cycle, wherein the single architectural cycle contains multiple compute element operations; and execute a compiled task on the array of compute elements, based on the set of directions that was augmented.

* * * * *